United States Patent
Lee et al.

(10) Patent No.: US 7,226,243 B2
(45) Date of Patent: Jun. 5, 2007

(54) LOAD-BEARING, LIGHTWEIGHT, AND COMPACT SUPER-INSULATION SYSTEM

(75) Inventors: Kang Lee, Sudbury, MA (US); Daniel Louis Leeser, Framingham, MA (US); Mark Krajewski, West Newton, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 0 days.

(21) Appl. No.: 10/840,209

(22) Filed: May 5, 2004

(65) Prior Publication Data

US 2005/0047871 A1    Mar. 3, 2005

Related U.S. Application Data

(60) Provisional application No. 60/468,365, filed on May 6, 2003.

(51) Int. Cl.
*F16L 59/12* (2006.01)
*F16L 59/125* (2006.01)
*F16L 59/14* (2006.01)
*F16L 9/18* (2006.01)

(52) U.S. Cl. .................. 405/154.1; 405/157; 138/113; 138/114; 138/178; 166/242.1

(58) Field of Classification Search ............ 138/113, 138/114, 177, 178, 148; 405/154.1, 157, 405/168.1, 168.2; 166/242.1

See application file for complete search history.

(56) References Cited

U.S. PATENT DOCUMENTS

| 2,174,770 | A | | 10/1939 | Wilson |
| 2,188,007 | A | | 1/1940 | Kistler |
| 2,870,109 | A | | 1/1959 | Nickerson |
| 3,680,631 | A | * | 8/1972 | Allen et al. .................. 166/57 |
| 4,037,626 | A | * | 7/1977 | Roberts, Jr. ................. 138/109 |
| 4,237,023 | A | * | 12/1980 | Johnson et al. .............. 252/70 |
| 4,363,738 | A | | 12/1982 | Kummermehr |
| 4,447,345 | A | | 5/1984 | Kummermehr |
| 4,570,678 | A | * | 2/1986 | Ziemek et al. .............. 138/113 |
| 5,124,101 | A | | 6/1992 | Hirao et al. |
| 5,306,555 | A | * | 4/1994 | Ramamurthi et al. ......... 442/63 |

(Continued)

FOREIGN PATENT DOCUMENTS

FR    2 815 693 A1    4/2002

(Continued)

OTHER PUBLICATIONS

Ferrari, et al., A Lightweight PIP Solution for Ultra Deep Water Applications:, UDEP Conference, Brent, France (2002), 19 pages.

(Continued)

*Primary Examiner*—Tara L Mayo
(74) *Attorney, Agent, or Firm*—Peongunran Muthukumaran; Kawai Lau (57) ABSTRACT

A lightweight and compact super-insulation system that is also capable of supporting a high level of compressive load. The system utilizes spacers to provide structural support and utilize controlled buckling of a thin protective outer skin supported by spacers to form strong catenary surfaces to protect insulation material underneath. The spacers may comprise an aerogel, or an aerogel may provide insulation separate from the spacer yet contained within the thin outer skin.

54 Claims, 7 Drawing Sheets

U.S. PATENT DOCUMENTS

| | | | |
|---|---|---|---|
| 5,569,513 A | 10/1996 | Fidler et al. | 428/35.6 |
| 5,786,059 A | 7/1998 | Frank et al. | |
| 5,789,075 A | 8/1998 | Frank et al. | |
| 5,858,489 A | 1/1999 | Beauquin | 428/36.5 |
| 5,866,027 A | 2/1999 | Frank et al. | |
| 5,934,334 A | 8/1999 | Gray, Jr. et al. | 138/112 |
| 5,972,254 A | 10/1999 | Sander | |
| 5,973,015 A | 10/1999 | Coronado | |
| 6,068,882 A | 5/2000 | Ryu | |
| 6,087,407 A | 7/2000 | Coronada et al. | |
| 6,158,475 A | 12/2000 | Clemmer | 138/112 |
| 6,318,124 B1 | 11/2001 | Rutherford et al. | |
| 6,403,180 B1 * | 6/2002 | Barrall | 428/36.5 |
| 6,479,416 B1 | 11/2002 | Frank et al. | |
| 6,528,153 B1 | 3/2003 | Benzing et al. | |
| 6,568,431 B2 * | 5/2003 | Marchal | 138/112 |
| 6,770,584 B2 | 8/2004 | Barney et al. | |
| 6,887,563 B2 * | 5/2005 | Frank et al. | 428/312.6 |
| 7,078,359 B2 | 7/2006 | Stepanian et al. | |
| 2002/0094436 A1 | 7/2002 | Ohtake et al. | |
| 2003/0077438 A1 | 4/2003 | Frank et al. | |
| 2003/0082357 A1 * | 5/2003 | Gokay et al. | 428/212 |
| 2004/0076476 A1 | 4/2004 | Hallot et al. | 405/157 |
| 2004/0091321 A1 | 5/2004 | Bastard et al. | 405/168.2 |

FOREIGN PATENT DOCUMENTS

FR      2 821 917 A1      9/2002

OTHER PUBLICATIONS

International Search Report for PCT/US2004/014129, mailed Jan. 5, 2005.
Written Opinion for PCT/US2004/014129, mailed Jan. 5, 2005.

* cited by examiner

LOAD-BEARING, LIGHTWEIGHT, AND COMPACT SUPER-INSULATION SYSTEM

RELATED APPLICATION

This application claims the benefit of U.S. Provisional Application No. 60/468,365, filed May 6, 2003, the entire teachings of which are incorporated herein by reference.

BACKGROUND

In deep- and ultra-deep-water oil and gas exploration, crude oil or gas is extracted from below the sea floor via a pipeline system to the water surface. It is important to maintain the temperature of the hot crude oil or gas flowing in the pipe above about 30–50° C. depending on the composition of the hydrocarbons (e.g., crude oil or natural gas). Maintaining a temperature in this range prevents flow restrictions or clogging due to formation of hydrates or wax, which can occur via cooling of the crude oil or gas by cold water as the hydrocarbons flow from the underwater well to the production plant on the surface. Also, if the well must be capped for maintenance or due to inclement weather, it is highly desired to keep the temperature of the hydrocarbon inside the pipe and other parts of the pipeline systems (e.g., a Christmas tree or subsea tree, risers, etc.) above precipitation temperature for as long as possible to minimize or avoid expensive and time-consuming de-clogging processes before resuming the pumping operation.

These are the so-called flow assurance requirements for the underwater pipe-in-pipe configuration. The pipe-in-pipe configuration has been the traditional method of choice to satisfy the flow assurance requirements of the deep-water exploration. The configuration uses two thick concentric pipes; i.e., the inner pipe (flow line or flow pipe) and the outer pipe (carrier pipe). The flow line carries the hydrocarbon coming out of the well at high temperature (e.g., 60–300° C.) and at high pressure [e.g., up to about 70 MPa (10,000 psi)]. The carrier pipe is designed (independent of the flow line) to withstand the external hydrostatic pressure that proportionately increases with depth [e.g., about 28 MPa (4000 psi) at 2800 m].

In the annulus between the two pipes, split-ring spacers (also referred to as "centralizers"), which are made of a material having relatively low conductivity (e.g., a polyamide), are installed at regular intervals (e.g., at 1.2-m intervals). The spacers act as a guide during the insertion of the inner pipe into the outer pipe; each pipe can be 1 or 2 km in length.

The spacers are also designed to help maintain the annular gap between the two concentric pipes when the pipe-in-pipe apparatus is bent for winding onto a spool or when it bends after installation. In the annular gap between the spacers, insulation material is wrapped around the flow line. The insulation material can be, e.g., a urethane foam having a thermal conductivity of 24 mW/m-K and higher or a fumed silica product packaged in vacuum with thermal conductivity of 21 mW/m-K.

In some locales, the temperature of the crude oil coming out of the well is only 60° C., which is not very hot, as is the case off the coast of Angola. As a consequence of this relatively low temperature, a much higher level of insulation is needed to prevent hydrate formation due to cool down. Also, as the recoverable oil and gas deposits in the shallow sea bottom are exhausted, the wells will be drilled in increasingly deeper waters. The current pipe-in-pipe design, while acceptable down to a depth of 1000 m, meets severe obstacles when the underwater field gets much deeper than 1000 m, as described below.

As the well depth increases, the following obstacles and technical issues have to be overcome. As a starting point, the characteristics of hydrocarbons become more prone to forming wax or hydrates. Additionally, since the distances between the deeper wells and the production plant on the surface platform are significantly increased, the overall-heat-transfer (OHT) value of the pipe-in-pipe apparatus must ordinarily be reduced to very low values, such as 0.5 $W/m^2$-° C. with a transient cooling requirement of less than 30° C. in 16 hours, to prevent over-cooling of the recovered hydrocarbons. Providing a pipe-in-pipe apparatus with this very-low OHT value would ordinarily necessitate significantly increasing the thickness of insulation, which in turn would increase the inner diameter of the carrier pipe needed to accommodate the additional insulation contained within the carrier pipe.

As the inner diameter of the carrier pipe increases, the carrier-pipe wall thickness that is needed to withstand a fixed external pressure in this context increases as an approximately proportional function of the increase in the outer diameter of the carrier pipe. Moreover, as the depth increases, the external pressure acting upon the carrier pipe increases as a linear function of the depth. For each 10.33 m of water depth, pressure increases by 1 atm (100 kPa). At 2500 m, the hydrostatic pressure reaches about 25 Mpa (3560 psi). The thickness of the carrier pipe wall is increased approximately proportionally with an increase in the hydrostatic pressure for a given inner radius. Therefore, the carrier pipe wall is fabricated with increasing thickness as the pressure for the intended usage is increased, which causes further increase in the outer diameter of the carrier pipe as the intended usage depth increases.

As the carrier pipe gets larger in diameter and in thickness, the following disadvantages result. First, the weight of the pipe-in-pipe apparatus increases sharply, increasing approximately proportionally with the square of the wall thickness and linearly with the mean diameter. Second, the material cost increases as the amount of steel and insulation increases. Third, additional labor and heavier equipment is needed to produce the pipe-in-pipe apparatus. Fourth, heavier equipment is needed to wind the pipe-in-pipe apparatus onto a spool and also to install the pipe-in-pipe apparatus; the equipment that is currently used may need to be reinforced and strengthened (at a significant level of capital expenditure) to handle the much heavier pipes that would be required for depths of 2500 m and deeper. Fifth, the submerged weight of the pipes can become too heavy for the currently used derricks or ships to handle the load and keep it stable in rough seas; the excess weight of the pipes accordingly necessitates building larger derricks, ships and larger buoyancy tanks at increased costs and decreased stability in the rough waters. Finally, the ship must make more trips to transport the necessary pipe lengths.

The current pipe-in-pipe manufacturing operation is extremely labor intensive and therefore costly. The pipes used for flow lines and carrier pipes generally come in 12-m (40-ft) lengths from the supplier. At the factory, the 12-m long pipes are first welded together into 1- or 2-km long sections of the outer carrier pipe. Section by section, polyamide spacers (centralizers) are installed onto the inner flow-line sections and thermal insulation is wrapped around the flow-line sections between the centralizers. After each flow-line section is insulated and secured by strapping with tapes, that section will be pushed into a waiting carrier pipe.

The next section of the flow line is welded to the section to be inserted into the carrier pipe. The centralizers help guide the flow line during insertion into the carrier pipe. This process continues until the full length of the 1-km or 2-km pipe-in-pipe apparatus is assembled. The processes of welding the pipes and installing the centralizer and thermal insulation occur in stop-and-start fashion and require substantial manual labor and time.

In an alternative method currently used, the entire 1- or 2-km sections of the flow line and the carrier pipe are welded separately. Then, the entire length of the flow line is fitted with centralizer rings at regular intervals and with thermal insulation between the centralizers, and covered and fastened in place with tapes. The completed insulated flow line is then carefully inserted into the waiting carrier pipe relying on the centralizers to maintain the annular gap and thus protect the insulation during the insertion operation.

For the reasons discussed above, when the depth increases significantly for the underwater pipeline, it will become more economically and logistically unacceptable to continue to use the current design of pipe-in-pipe apparatus, insulation material, and manufacturing process. Both manufacturing methods described above represent the state-of-the art pipe-in-pipe manufacturing process and are very labor intensive, costly and slow.

In one recent pipe-in-pipe design, the inner flow line is covered with non-load-bearing insulation protected by a carrier pipe made of Glass Reinforced Plastic (GRP). The GRP pipe is connected mechanically to the flow line at both ends of a 12-m long pipe section using mechanical joints comprising a load-bearing polymeric material able to guarantee the thermal and mechanical performances. A relatively high-performance, but non-load-bearing insulating material with thermal conductivity of approximately 21 mW/m-K fills the annular space between the flow line and carrier pipe and provides the required thermal performances. The authors describe how much lighter this new pipe would be compared to the current pipe-in-pipe design and how much more conveniently the pipe could be produced in an automated process. Although the submerged weight of this new configuration may be less than that of a conventional pipe-in-pipe apparatus designed for the same operating conditions, the ability of the fiberglass to withstand the seawater conditions on a long-term basis is unproven, and the outer layer remains extremely thick. Therefore, the GRP pipe may not have the necessary bending flexibility, and, as a consequence, additional trips may be needed to carry the larger diameter pipes to installation sites.

In the conventional pipe-in-pipe design and also in the GRP pipe-in-pipe design, described above, the inner pipe is designed to withstand the usually high inner pressure [e.g., 70 Mpa (10,000 psi)], and the outer pipe is designed to independently withstand the external crushing pressure [15 Mpa (2170 psi) at 1.5 km (5000 ft) and 30 Mpa (4340 psi) at 3 km (10,000 ft)].

SUMMARY

The thermal insulation systems of this disclosure can be used for such diverse applications as deep-water pipeline insulation, LNG tanker insulation, process piping, etc. These systems insulation systems can be characterized as follows: lightweight, thin, low-cost, high thermal-insulation performance and high load-bearing capability, as well as being easily installed and maintained. Pre-existing insulation systems may satisfy some of the above desired properties but not all of them. For example, evacuated multiple layer insulation (MLI) encased in heavy metal frames performs marvelously in terms of load-bearing capability and thermal performance; but, in general, MLI's are extremely heavy and expensive and are very difficult to manufacture, install and maintain. On the other hand, low-density silica aerogels offer excellent insulation with up to five times the thermal-insulation performance of commonly used fiberglass in ambient conditions, though the low-density aerogels typically cannot support the load beyond a fraction of an atmosphere before getting compressed. Fiberglass is cheap, but it is too bulky and ineffective; moreover, fiberglass is non-load-bearing, and its installation is messy. Foam can be load-bearing to a very limited extent, and the thermal-insulation performance is too low.

The advanced embodiments of insulated structures, described below, can be used for deep-water and especially for ultra-deep-water oil-and-gas exploration and other applications. The structure includes a thin protective outer skin and an underlying structure contained by the outer skin. One or more spacers are provided between the outer skin and the underlying structure. The spacers provide structural support for the outer skin and can enable the outer skin to be deformed to produce catenaries between spacer contact surfaces to place the outer skin under a tensile stress when subjected to an external pressure load. In one embodiment, the insulated structure is a pipe-in-pipe apparatus, wherein the outer skin is a carrier pipe with thin walls and the underlying structure is a flow line for transporting hydrocarbons.

When designed for a given set of operating conditions, the new design can offer the following advantages and salient features over the state-of-the-art: (a) a much thinner (by nearly an order of magnitude) wall of the outer skin; (b) a much smaller carrier-pipe outer diameter; (c) a drastically reduced total weight (reduced by close to one half that of the conventional design); (d) a higher flexibility and a tighter bending radius (approaching that of the inner pipe alone in the state-of-the art or GRP pipe-in-pipe design); (e) more effective thermal insulation between the underlying structure and the outer skin; (f) a lower material and fabrication cost; (g) a smaller spool diameter or fewer spools for the same length of a pipe-in-pipe installation; and (h) a lower installation and maintenance cost, etc. Additionally, pipe-in-pipe designs of this disclosure are eminently suitable for automated fabrication in mass scale to drastically reduce the labor cost and therefore reduce the total cost of the pipe-in-pipe apparatus. Further still, fewer trips to the installation site need be made to carry the same length of pipe-in-pipe apparatus for spool or J-lay installation.

Even though various principles of this invention can be applied to many parts of the subsea system, the description of the invention provided here will focus, for the sake of simplicity of presentation, on a pipe-in-pipe application.

BRIEF DESCRIPTION OF THE DRAWINGS

In the accompanying drawings, described below, like reference characters refer to the same or similar parts throughout the different views. The drawings are not necessarily to scale, emphasis instead being placed upon illustrating particular principles of the methods and apparatus characterized in the Detailed Description.

DETAILED DESCRIPTION

Traditional pipe-in-pipe designs, and even the recent GRP design, rely on the outer carrier pipe having sufficient thickness and strength to handle the external load on its own without collapsing under normal operating conditions. By necessity, this makes the outer wall of the carrier pipe relatively thick.

When a pipe is exposed to an external pressure, q, the failure mode ordinarily is that of pipe collapse due to elastic buckling instability under compressive load, which is approximately given by:

$$q = \frac{1}{4} * \frac{E}{1-v^2} * \frac{t^3}{r^3} \qquad \text{(Eqn. 1)}$$

(Warren C. Young, Formulas for Elastic Stability of Plates and Shells, Roark's Formulas for Stress and Strain, Sixth Edition, McGraw-Hill, Inc., Equation 19.a, Table 35, 1989), where q is the external pressure; E is Young's Modulus; v is Poisson's Ratio; t is the wall thickness; and r is the mean radius. For a long tube held circular at intervals of l, $$q = 0.807 * \frac{E}{l} * \frac{t^2}{r} \sqrt[4]{\left(\frac{1}{1-v^2}\right)^3 * \frac{t^2}{r^2}} \qquad \text{(Eqn. 2)}$$

(Warren C. Young, Formulas for Elastic Stability of Plates and Shells, Roark's Formulas for Stress and Strain, Sixth Edition, McGraw-Hill, Inc., Equation 19.b, Table 35, 1989).

As an example, let us take a pipe with the mean radius of 6 inches (15 cm) made of steel with a tensile strength of 80,000 psi (550 MPa), a Young's Modulus of 30 million psi (200 GPa), and a Poisson's Ratio (v) of 0.29, which is subjected to 4,000 psi (28 MPa) of external pressure. Since the pressure is external, the failure mode is that of buckling instability; and the necessary wall thickness to resist collapsing due to buckling instability, calculated from Equation 1, is 0.47 inches (1.2 cm). When there is an internal support, such as spacers, however, the situation markedly changes for the better. For instance, if the spacer is thin and circular and is placed regularly apart along the length of the pipe such that l=6 inches (15 cm), the required wall thickness, calculated from Equation 2, is only 0.18 inches (4.6 mm), which represents a 62% reduction in wall thickness.

Figure 1:
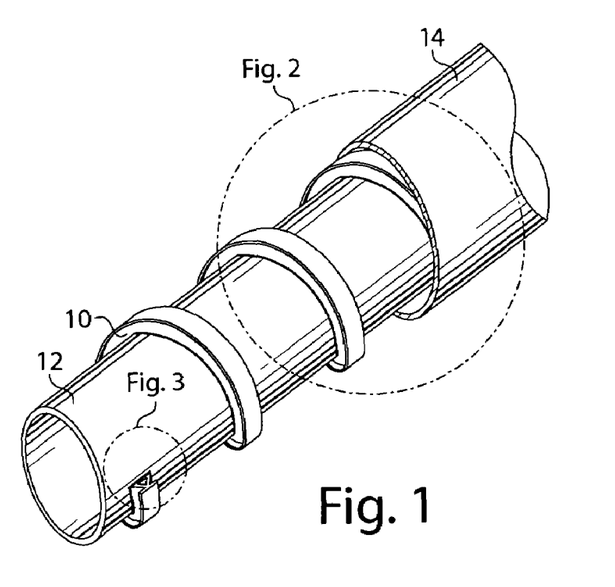
FIG. 1 is an exposed, perspective view showing a flow line, a helical spacer and a carrier pipe.

As illustrated in FIG. 1, a relatively thin-walled carrier pipe 14 can be well supported by the spacers 10 (use of the term "spacers" herein can refer to discrete spacers or turns of a helically wound continuous spacer) in the annulus, where the spacers 10 are firmly supported by the flow line 12. In a first embodiment, the thin-walled carrier pipe 14 is mechanically supported, in the case of using insulation material that cannot bear the external pressure load, by strategically placed spacers 10 in the annulus of the pipe-in-pipe apparatus along the length of the pipes 12, 14. The carrier pipe 14 forms a catenary surface between the spacers 10, and the principal stress experienced by the thin catenary forming wall of the carrier pipe 14 under load is tensile. As used herein, references to a "catenary" shape or "catenary-like" shape refer to shapes that fairly closely match the graph of a hyperbolic cosine that characterizes a perfect catenary. However, a perfect catenary is only possible with perfectly flexible materials, which fits few if any "real world" structures. Accordingly, references to catenary or catenary-like shapes herein includes those shapes that vary somewhat from perfect catenaries due to limitations in flexibility and other "real world" influences, interferences and limitations.

Placement of the spacers 10 is a matter of optimization. If the spacing is too large, the wall thickness of the carrier pipe 14 will have to be thick; and if the spacing is too small, the wall thickness of the carrier pipe 14 will be thin but the thermal conduction loss through the spacer 10 will increase. For optimization of spacer 10 spacing, the material properties of the spacer 10, such as thermal conductivity and mechanical strength of the carrier wall, are taken into account to arrive at the right spacing. Greater mechanical strength of the carrier wall and greater thermal conductivity of the spacer 10 both encourage the adoption of greater distances between the spacers 10 (or between revolutions of a spacer in a helical configuration). The spacers 10 can be made from structurally strong material such as steel or high-strength composites. In particular embodiments, the spacer 10 includes a separate layer of thermal insulation that can withstand the compressive load.

In a second embodiment, the thin-walled carrier pipe 14 is mechanically supported by an advanced insulation in the annulus (that has both excellent thermal-insulation capability and excellent compressive strength). The thermal conductivity of the insulation can be, e.g., 50 mW/m*K or less. The principal stress experienced by the thin wall of the carrier pipe 14 under external pressure load in this embodiment is radial and mostly compressive. The advanced insulation in this second embodiment has sufficient structural strength to withstand the mechanical load and can provide an excellent level of thermal insulation. It is also a special case of the first embodiment where the spacer is made of the special structural insulation material and fills the annulus along the length of the pipes rather than being placed apart at intervals as in the first embodiment.

For example, the spacer can be formed of an aerogel, such as a pre-conditioned silica aerogel or a high-strength cellulose aerogel, such as those available from Aspen Aerogels (Northborough, Mass., USA). Aerogels are described in greater detail in U.S. Pat. No. 6,670,402, which is incorporated herein by reference in its entirety. A silica aerogel can be pre-compressed to the maximum pressure level anticipated in the operation; precompressed silica aerogels have been found to show little deterioration in thermal performance for the same thickness after they are compressed. Cellulose aerogels exhibit extremely high structural strength even without precompression, while still providing excellent thermal insulation performance.

Figure 2:
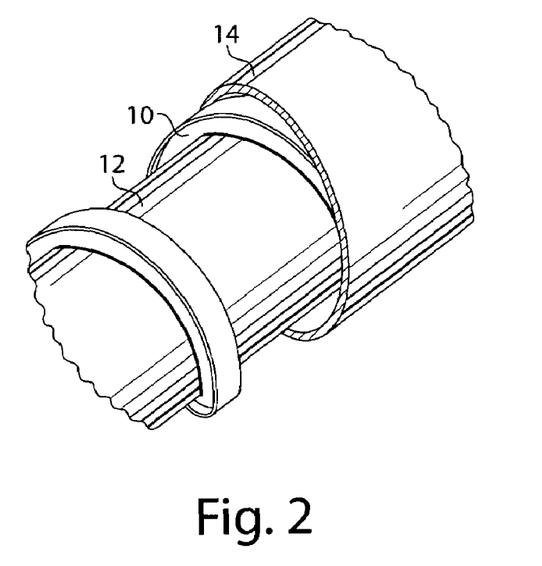
FIG. 2 is a magnified view of the apparatus of FIG. 1.
Figure 3:
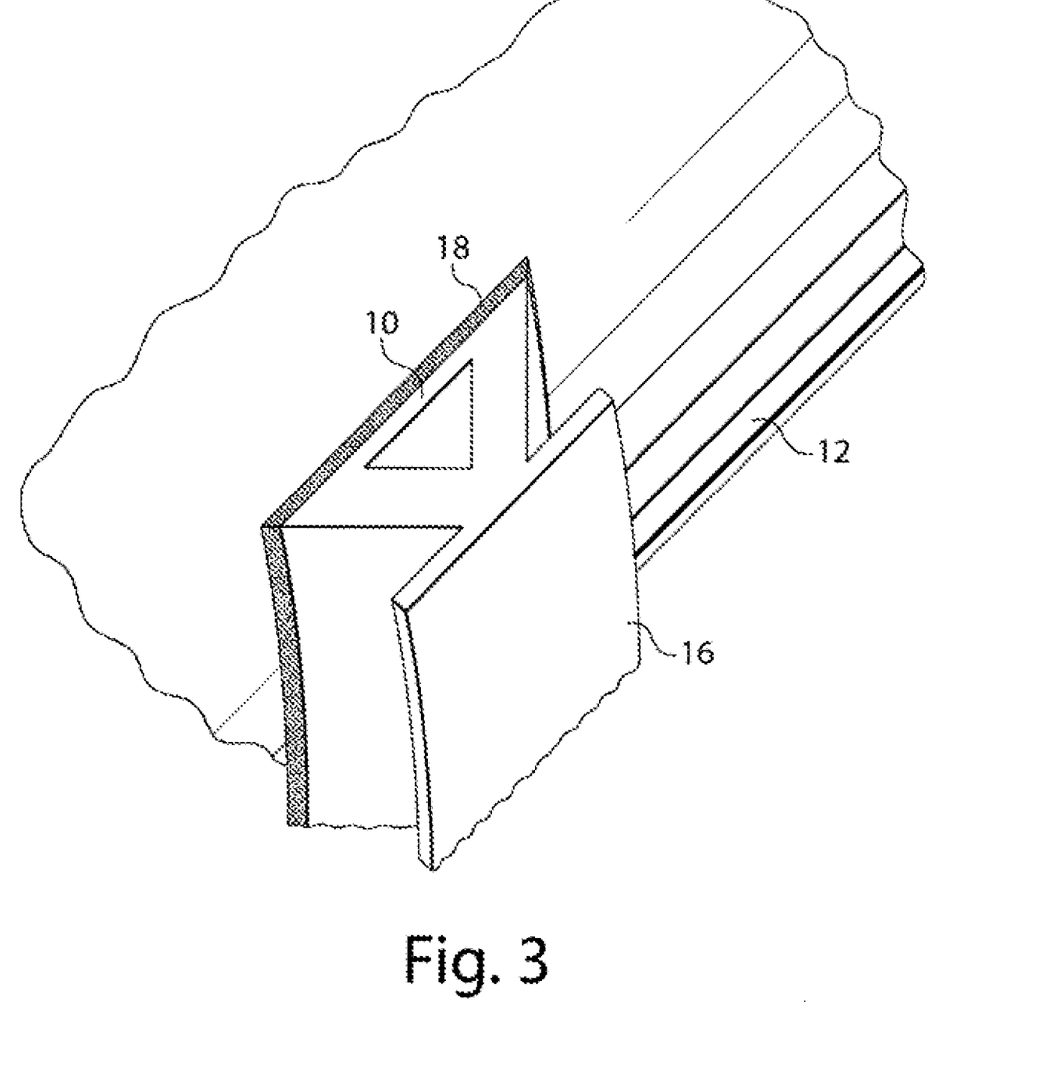
FIG. 3 is a partially cut-away perspective view of the detail of a spacer having a triangular cross-section, with a weld strip and load-bearing insulation.

In the design illustrated in FIGS. 1–3, a thin spacer 10 is helically wound over the flow line 12. The angle of the helix is between zero degrees (i.e., discrete spacer rings) and eighty degrees, where the actual angle depends on the width of the spacer used and the required gap between spacers. The spacer 10 supports a relatively thin carrier pipe 14 (see FIG. 2). In the embodiment of FIG. 3, the triangular cross section of the spacer 10 is evident; the triangular cross section is especially amenable to a winding operation and is capable of handling well the concentrated load coming from the carrier pipe 14 under external load. A weld strip 16 (optional) and load-bearing insulation 18 (optional) can also be seen in FIG. 3. The optional weld strip 16 is welded to the spacer 10 (extending beyond the flat top surface of the spacer 10) and to the carrier pipe 14 and serves to ensure the integrity of the weldment and to provide high weldment strength. The weld strip 16 also spreads the external load, thereby reducing the stress concentration in the carrier pipe 14 under operating load. The optional load-bearing insulation 18 will ensure significant reduction in the heat transmitted from the wall of the carrier pipe 14 through the weld strip 16 and through the main structural body of the spacer 10 with the triangular cross-section. The spacer 10 envisioned here structurally supports the carrier pipe 14 and also thermally separates the flow line 12 and the carrier pipe 14 very effectively.

Figure 4:
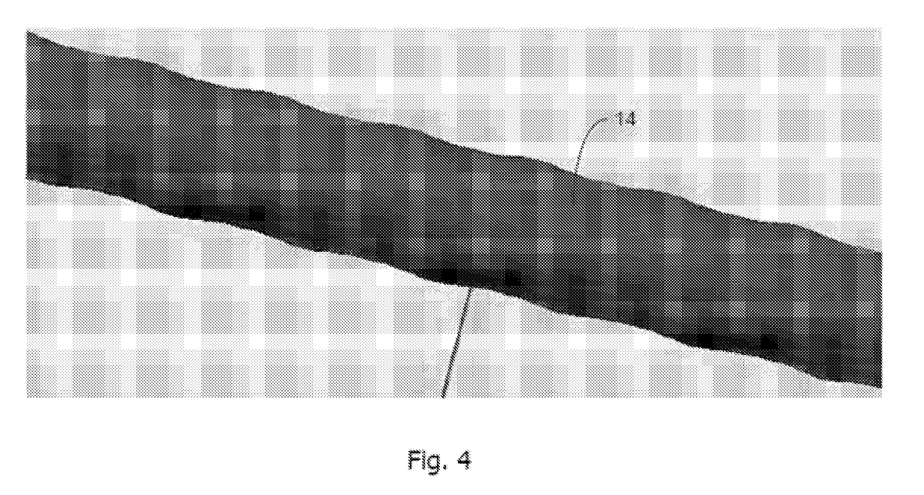
FIG. 4 is a perspective view of a thin-walled carrier pipe in catenary deformation under external load to rely on the high tensile strength instead of the low collapse strength of the carrier pipe.

The wall of the carrier pipe 14 is relatively thin and is allowed, by design, to collapse under normal operation to form a catenary between spacers strategically located underneath the carrier pipe 14, as shown in FIG. 4. In this case, the initial collapse is immediately turned into a tensile loading of the carrier pipe 14. Accordingly, failure of the carrier pipe 14 will require overcoming the high tensile strength of the carrier pipe 14 instead of being a function of the relatively low collapse strength of the carrier pipe 14.

It was already illustrated using Equations 1 and 2 that the catenary design results in a 62% reduction in the thickness of the carrier pipe if the spacer rings (e.g., consecutive rotations of the spacer in a helical configuration, measured at a common radial position) are spaced 15 cm (6 inches) apart for the same flow-pipe diameter (i.e., 10 cm) and operating conditions given previously. This reduction in thickness will significantly decrease the weight of the carrier pipe 14. Of course, in terms of keeping account of the total weight of the pipe-in-pipe apparatus, one has to add the weight of the spacers 10. However, the weight contribution of spacers 10 averaged over the entire span would be relatively small and would be far outweighed by the weight savings resulting from use of the thinner carrier pipe.

The spacers 10 are supported in the radial direction by the flow line pipe 12. The spacers 10 take the load transmitted through the contact surface with the carrier pipe 14. Under pressure loading both from inside the flow line 12 and from outside the carrier pipe 14, the spacers 10 become the mechanical link between the carrier pipe 14 and the flow line 12. In fact, this bi-directional load transmission has the beneficial effect of at least partially balancing the inner tube pressure of the hydrocarbons with the outer pressure of the sea water. For example, if the inner pressure coming from the hydrocarbon is 69 MPa (10,000 psi) for the flow line pipe 12, and if the outside pressure for the carrier pipe 14 caused by the sea water is 28 MPa (4000 psi), the effective loading on the flow line 12 is only 41 MPa (6000 psi). Seen another way, the spacers 10 can be regarded as "girders" for the flow line 12. Because of the pressure balancing and the girder effects of the spacers, the wall thickness for the flow line 12 can also be reduced, in accordance with the effective reduction in the loading experienced by the flow line 12 as described above.

Spacer Design

The spacers can be discrete (e.g., in the form of separate rings) as implied by Equation 2. Alternatively, the spacers can be of continuous helical design as shown in FIG. 1. In a limiting case, a spacer will turn into a full cylinder occupying the annulus formed between the inner flow line and the outer carrier pipe. Apart from the above-mentioned limiting case, the cross section of the spacer can be either solid or tubular (hollow) and can take a variety of shapes, such as a circle or triangle, depending on the material and the operating conditions one chooses. FIGS. 1–3 show a rendering of a helically wound spacer with a special cross section designed to perform multiple functions well. The cross-section of the spacer should be such that it will be conducive to being bent around the pipe without collapsing the tubes. For example, triangular, circular, elliptical and trapezoidal tubes can be easily wound around a pipe in a controlled manner without overly collapsing the interior volume of the tube.

FIG. 3 shows the details of this particular helical spacer 10 that includes a tubing of triangular cross section between a load-bearing and insulating strip 18 at the bottom and a flat strip 16 on top. The triangular shape was chosen to handle the compressive loading and to minimize the heat transfer from the carrier pipe 14 to the spacer 10 and to the flow line 12. The overall heat transfer value from the carrier pipe to the flow line can be, e.g., 5 W/m$^2$-° C. or less. The lower part (i.e., the side facing the flow line pipe 12) of the spacer 10 has a load-bearing and insulating strip 18 in the form of a high-compressive-strength aerogel strip designed to thermally isolate the metal spacer coil 10 from the inner flow line 12. The aerogel strip can be formed of pre-compressed fiber-reinforced silica aerogels or cellulose aerogels, both having the requisite properties of high structural strength and excellent thermal insulation. The thickness of the strip will be determined by the insulation requirement for the spacer 10 and will generally range between 1 mm to the full gap dimension of the annulus between the flow line 12 and the carrier pipe 14, the latter case signifying the use of structural insulation as the full spacer 10. The flow line 12 is designed to handle the high-pressure hydrocarbon flow just like the flow lines currently in use.

Figure 5:
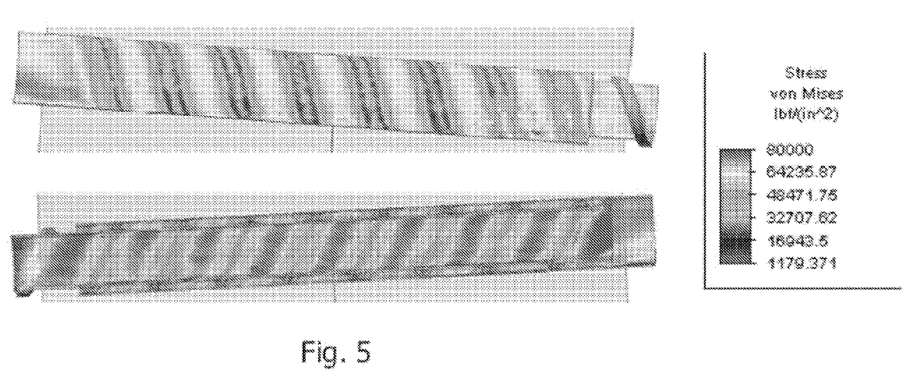
FIG. 5 is a preliminary stress plot of an advanced pipe-in-pipe apparatus with a helically wound spacer having a triangular cross section.

FIG. 5 shows a result of a preliminary finite element analysis that confirms the viability of the pipe-in-pipe apparatus with a spacer-supported thin outer skin. The spacer in FIG. 5 is helically wound and has a triangular cross section. The plots of FIG. 5 illustrate that the stresses in the outer wall are relatively low directly above the spacers and higher in the catenaries between the spacers.

The spacers 10 are also configured to provide no more than minimal heat transfer between the outer carrier pipe 14 and the inner flow line 12 while providing the necessary mechanical support for the thin outer skin (i.e., carrier pipe 14) that forms a catenary between spacers 10 in the case where there is an axial gap between spacers 10. The spacers 10, regardless of their design, are chosen to give very-high thermal resistance either via small contact areas preferably at the interfaces between the spacer 10 and the carrier pipe 14 and the flow line 12, as shown, or by using a load-bearing thermal insulation material for the spacers 10 or by placing a strip made of such a material between the spacers 10 and one or both of the pipes 12, 14. The spacers 10 can be discrete ring spacers or can be helically wound strips or tubes of various cross-sections.

The spacer cross-sections include, but are not limited to, tubes of circular or triangular cross-sections or solid rods of rectangular, circular or triangular cross-sections. The tubular spacers can be either evacuated, pressurized with fluids, or in pressure equilibrium with the annular space through breather holes.

Insulation Materials

The gap created between the two concentric pipes and the spacers can be evacuated, evacuted with radiation shields, partially or entirely filled with insulation materials, or simply filled with gases. Preferably, insulation materials such as low thermal conductivity gases, aerogels, or any other effective insulation material can be inserted in the annular space created between the flow line 12, the spacer 10 and the carrier pipe 14 depending on the requirements for the pipe-in-pipe installation and application at hand.

Pipe-in-Pipe Manufacturing Process

The new pipe-in-pipe apparatus can be produced in factories, on shore, or if necessary on board the ship. The machinery components can be lined up or arranged along the length of the pipe being manufactured to perform the manufacturing operation according to the following sequence:

1. At a pipe handling section, lengths of delivered pipe (usually in 12 m lengths) are loaded and fed for use as the flow line 12.
2. At a flow-line welding station, the individual lengths of pipe are welded to eventually form continuous sections of the flow line 12, usually in 1 or 2 km lengths.
3. A pipe feeder/rotator assembly forms the core of the entire fabrication operation by providing the linear and rotational motion of the ever-lengthening pipeline that will form the flow line 12. The assembly includes a linear thruster that pushes the pipe forward. The linear thruster, itself, is mounted on a rotator that rotates the long pipe. Combined, the assembly provides the linear as well as the rotational motion for the pipe as it undergoes various additions to form the advanced pipe-in-pipe apparatus. The helical angle and the pitch of the spacer 10 are controlled by the relative speeds of linear motion and the rotational motion provided by the feeder/rotator assembly.
4. The stock for the spacer 10 (e.g., a triangular tube sandwiched between a flat aerogel strip and a welder strip) is linearly fed at a spacer station and wound up onto the inner pipe in a helical fashion at a desired pitch and helical angle by the linear/rotating motion of the flow line 12.
5. The stock for the insulation is linearly fed into the empty volume between the helical turns of the spacer 10 at an insulation station and wound up onto the flow line 12 at a desired pitch and helical angle by the linear/rotating motion of the flow line 12. Consequently, the insulation will fill the space between the helically wound spacers 10. Multiple layers of the insulation can be provided either at separate substations or all at once at this station. After the proper amount of insulation is wound onto the flow line 12, the insulation is secured by a fastening layer at this station.
6. At an outer skin welding station, a thin metal strip that spans the gap between the helically wound spacers 10 is fed and welded onto the flat top portion of the spacer. The weldment consists of two adjacent metal strips that form the outer skin (i.e., carrier pipe 14) and the flat strip 16 centered along the top weld strip of the spacer 10 that forms the underlayment for the welding. This configuration ensures that the weldment of the carrier pipe 14 at the seams will be more secure and that the stress on the thin outer skin under design external pressure will be within an acceptable limit.
7. At a cleanup section, the weldment for the outer skin is cleaned in preparation for the coating operation.
8. At an end treatment section, the proper end sections, with provisions for pulling the finished pipeline, are attached both at the beginning of the long (e.g, 1 or 2 km) pipe section and at the end when the desired length of the flow line section is completed.
9. At a painting/coating section, the finishing touches are put on the advanced pipe-in-pipe apparatus by applying coating layers for various purposes, such as corrosion protection, rust prevention, etc.
10. At the finished section transport section, the final stages of the manufacturing process are performed. Once a 1 km (or 2 km) section is finished, the finished section will be rolled into a storage rack to be connected into much longer sections such as 10 or 20 km lengths onto a spool or to form a long floating pipeline to be towed to an installation area.

As is evident in the description given above, the entire operation can be automated with minimal involvement by human operators. The machine components described above are not particularly high tech or high cost. Consequently, the advanced pipe-in-pipe design is eminently amenable to low cost handling and manufacturing in contrast with the current practice of using a lot of manual labor and human involvement.

Use of the Load-Bearing, Lightwright and Compact Superinsulation System

So far, the new load-bearing, lightweight, compact, superinsulation system has been described for deep and ultra-deep underwater structure applications among others. The system can be applied to many parts of the underwater oil exploration system that requires effective thermal insulation under high external pressure, such as a flow line, a riser, a Christmas tree or subsea tree, in-field lines, and any other parts that would benefit from compact, lightweight super insulation with a relatively thin protective skin. Similar systems can be easily extended to insulate the LNG tankers and any other applications where the high load-bearing capability is required.

Special Embodiments:

Insulation for a Subsea Tree:

A Christmas Tree (subsea tree) of an underwater pipeline installation has many surfaces that are not tubular; for example, the surface that has to be insulated under pressure loading can be largely flat, flat, curved, or irregular. In such cases, a variation of the insulation system described thus far for pipe in pipe can be used; namely, strips of spacers can be attached to the surface of an inner conduit with appropriate spacing and, just like in the case of the pipe-in-pipe apparatus, insulation material can be installed between spacers. The insulation and the spacer grid will then be covered with relatively thin outer-skin sheet. Here, the idea is again to have the thin outer skin to withstand the external pressure loading by forming catenary surfaces supported by the spacer grid underneath, as described in the case of the pipe-in-pipe apparatus. Of course, the spacers will be designed and placed with sufficiently narrow spacing and sufficient height to prevent excessive compression of the underlying insulation and to distribute the compressive load across the surface of the underlying structure.

Insulation for a Liquefied Natural Gas (LNG) Tanker

A brief explanation as to how this insulation system would be used to effectively insulate a large system, such as an LNG tanker, follows. Unlike a pipe-in-pipe apparatus, the LNG tanker carries a large volume of liquefied natural gas inside the tank. The tank undergoes significant geometric/dimensional changes when the liquefied natural gas, which is at a cryogenic temperature, is introduced. The insulation system is designed either to move with the tank when it shrinks and expands or to be localized in order to avoid large displacements if all the spacers are connected throughout. In either case, there will be relative motion between the insulation system and the tanker or the outer shell if it is a double shell design depending on where the insulation system is physically attached.

For the sake of simplicity, we will assume that the insulation system is attached to a flat outer shell and the flat-bottomed LNG tank is supported by the insulation system. The relative movement of the LNG tank would be in the x-y plane at the interface between the LNG tank and the bottom plate. In this case, the insulation system includes (a) spacers that bear the weight load of the vessel containing the liquefied natural gas and (b) thermal insulation, such as a non-load-bearing aerogel, placed between the spacers. The spacers include load-bearing insulating (e.g., aerogel) strips to minimize heat conduction through the spacers. It is also possible to use load-bearing aerogels to fill the gap between the LNG tank and the outer wall and, in a special case, without the use of separate spacers. In the special case, the load-bearing aerogel layer is the spacer.

Insulation and Support Structure for a Flow Pipe for Transporting Liquified Natural Gas:

In another embodiment, the inner flow pipe carries liquified natural gas at ambient pressures or at slightly elevated pressures and is further mechanically supported by spacers (a.k.a., centralizers) or other mechanical structures that are placed in the annular space between the carrier pipe and the flow pipe. Insulating materials, such as aerogel particles or aerogel blankets, are positioned in the annular space to effectively insulate the fluid from gaining heat in the case of liquefied natural gas (LNG) transport and to prevent heat loss in the case of oil transport. Centralizers made of mechanically strong materials (e.g., steel) are used and further insulated with aerogel material to reduce heat conduction through the centralizers. Aerogel material is also inserted in the annular space between the pipes and between any two centralizers in the axial direction. If aerogel blankets are used, the blankets are staggered on top of each other around the edges to limit heat loses. After positioning the blankets, restriction means are used to make sure the blankets do not move out of place easily. Such an embodiment can be practiced either at normal external pressures or at high external pressures such as under the sea systems. The present invention provides ways to transport natural gas as a liquid which is otherwise transported as a gas in pipelines. Liquefied natural gas (LNG) is transported at low temperatures like −250 to 260° F. Even small perturbations in the temperature can cause undesirable changes in pressure that have to be taken in to account during the flow pipe design. The present invention provides flexibility in such designs due to the effectiveness of the insulation system.

Additional Applications of the Insulation System

The new lightweight, compact, super-insulation system is developed for deep- and ultra-deep-underwater-structure applications among others. The insulation system allows design advantages such as achieving highly effective insulation and the possibility of making the spacer contiguous over a long distance. The continuous-spacer design makes the system quite amenable to the introduction of phase change material or a heat pipe system to increase the effective heat capacity of the system and thereby extend the duration of non-flow mode for the well during maintenance or during an extended shut down due to weather, maintenance or accidents. Two related examples are given below.

Use of a Phase-Change Material (PCM):

A phase-change material (PCM) can be introduced in the space between spacers or even inside spacer tubes if the spacer tubes are not used as a heat pipe system. During shut-down periods, the heat stored in the PCM will be slowly released to the hydrocarbon contained inside the flow line while the insulation covering the PCM will keep the heat inside substantially shielded from the cold sea water. By providing excellent thermal insulation between the cold seawater and the PCM, the PCM can maintain the hydrocarbons above the desired temperature for a longer period of time than can a pipe in pipe system with inferior insulation value. One example of a suitable PCM is wax, particularly petroleum/paraffin wax, which can melt and resolidify as the temperature of the hydrocarbons rises and falls. For example, some oil compositions can be transported at 160–180° F., where waxes have typical melting points. However, by manipulating the wax composition, the PCM can be created to have a varied melting point depending on the transport temperature. The PCM would transfer heat back into the flowing hydrocarbons as the PCM solidifies from a melt.

Figure 6:
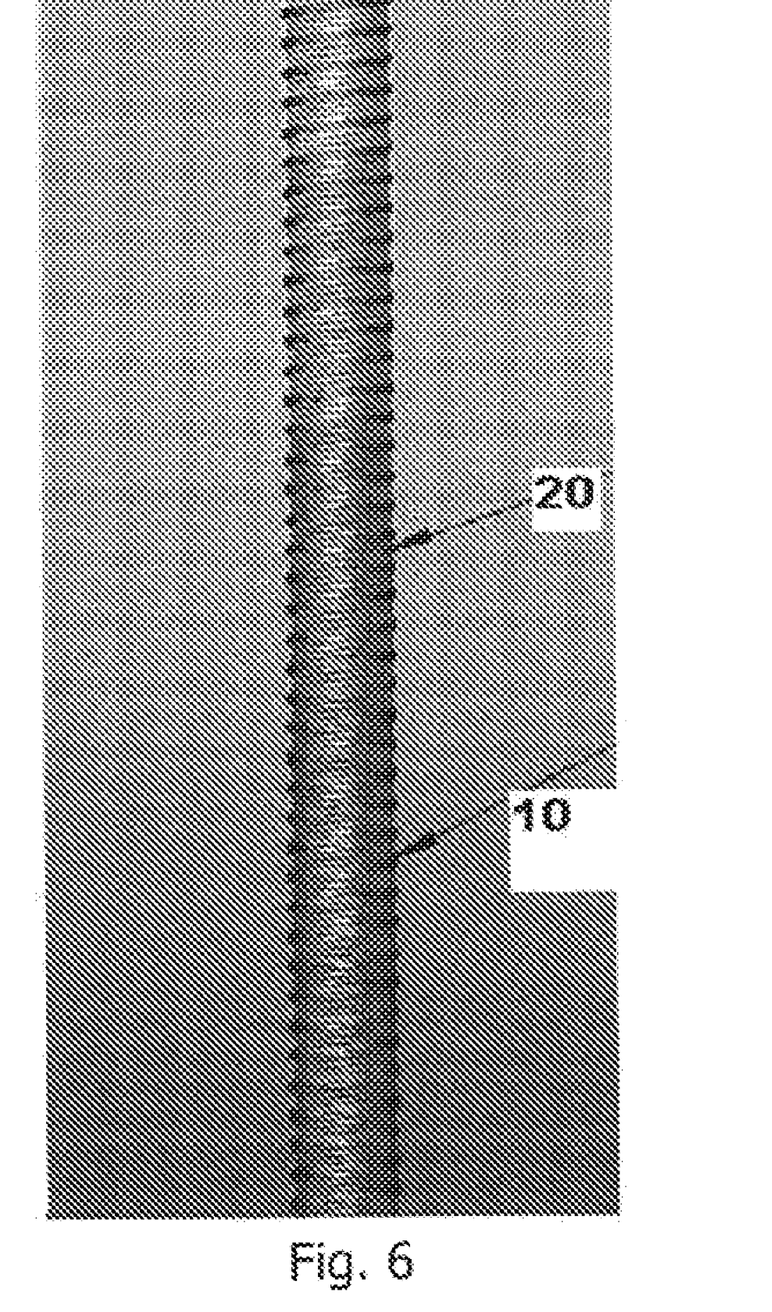
FIG. 6 illustrates a heat pipe system that uses geothermal energy to maintain the warmth of hydrocarbons in a pipe-in-pipe apparatus.
Figure 7:
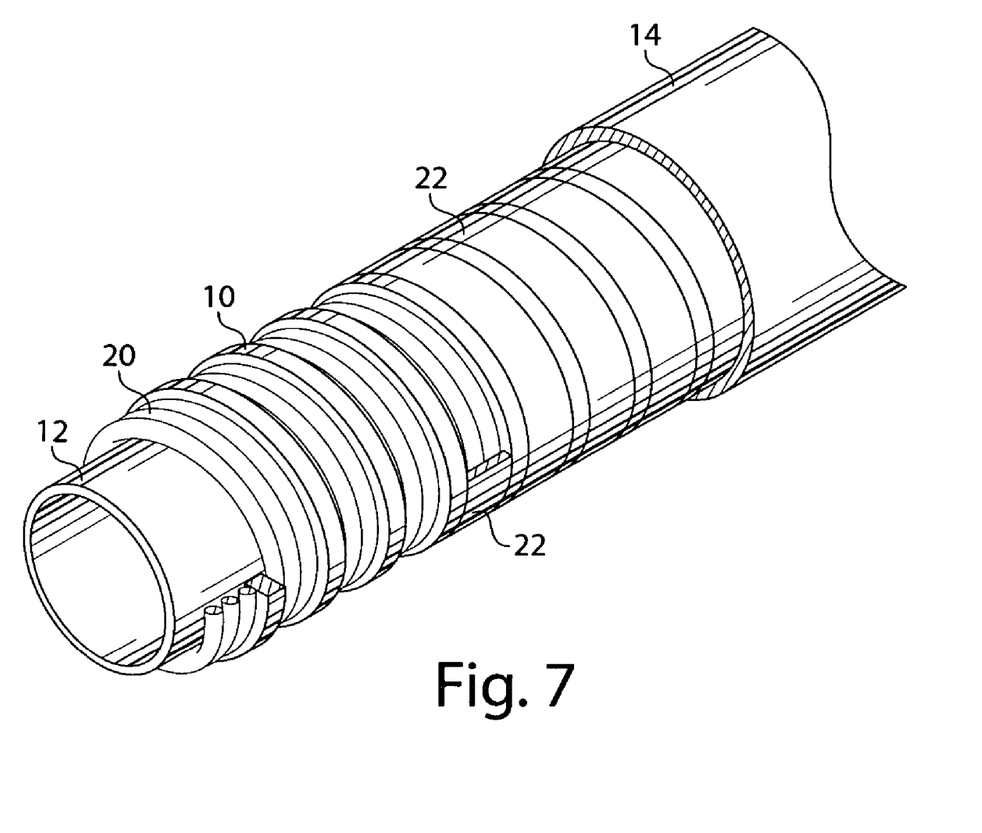
FIG. 7 is a close-up view of various layers of the heat pipe system and pipe-in-pipe apparatus of FIG. 6.
Figure 8:
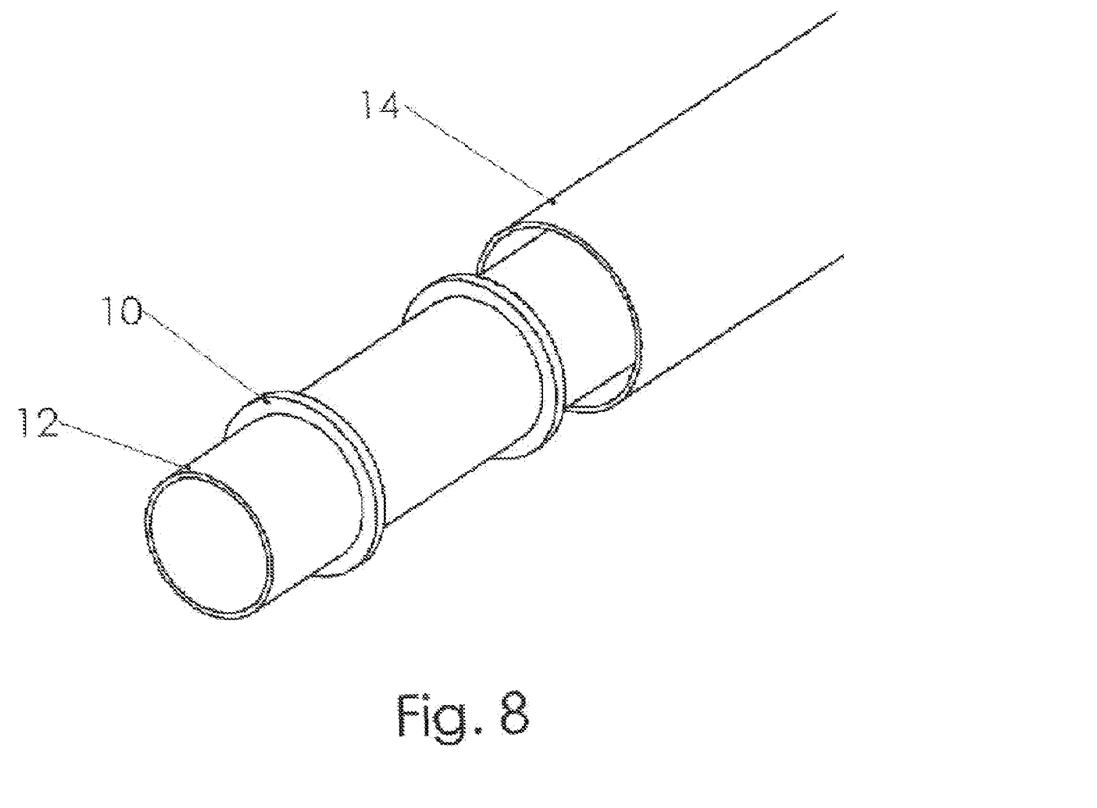
FIG. 8 is an exposed, perspective view showing a flow line 12, a spacer 10 in the form of a discrete ring, and a carrier pipe 14.

Geothermal Heat Pipe to Keep the Hydrocarbons Warm During Operation and Shutdown:

If the helical spacer coils are equipped with appropriate passages (such as a fine mesh layer functioning as wicks) for a liquid phase and vapor core at the center, contiguously connected over a required long distance, and filled with an appropriate heat-pipe fluid (examples provided below), a heat pipe system can be created that utilizes the geothermal energy from below the sea bottom to keep the hydrocarbons in the pipe in pipe and other subsea systems above the precipitation temperature for an extended period during normal operation or even during shutdown periods for maintenance or storm. Such an apparatus is illustrated in FIG. 6, where coiled heat pipes 20 fill the gap between turns of a coiled spacer 10 on a flow line extending from the ocean floor, at bottom, through the water, above. An appropriate heat-pipe fluid is a fluid that changes its state from liquid to vapor or vice versa within the temperature and pressure limits of the system in operation. Examples include water, alcohol, glycol, sodium, etc. As shown in FIG. 7, separate heat pipe tubes 20 run between turns of a coiled spacer 10 and are thermally insulated by aerogel insulation layers 22.

The heat-pipe fluid moves according to the following path within the conduit. The liquid from the cold side of the conduit is transported by the surface tension of the liquid acting on the fine wick layer on the inner perimeter of the tube to the hot side where the liquid boils away and collects into the vapor channel (most prevalently in the core region). The vapor pressure generated by boiling drives the vapor toward the cold region. Once the vapor reaches the cold region, it condenses to liquid and gets into the wick to be sent back to the hot spot by surface tension induced pumping within the wick layer. The heat pipe system will obviate the need for the electrical heating or other heating methods that are very expensive to install, maintain and thus far less desirable than the heat pipe system, described above.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Moreover, while this invention has been shown and described with references to particular embodiments thereof, those skilled in the art will understand that various other changes in form and details may be made therein without departing from the scope of the invention.

What is claimed is:

1. A pipe-in-pipe apparatus for thermally insulating a flow line comprising:
   a metallic flow line;
   at least one spacer around the flow line;
   a carrier pipe that is concentrically aligned with the flow line so as to create an annular space between the flow line and carrier pipe, wherein the spacer is in that annular space; and
   an aerogel blanket within the annular space between the flow line and the carrier pipe.

2. A method for underwater hydrocarbon transport, the method comprising:
   placing the pipe-in-pipe apparatus according to claim 1 underwater.

3. The method of claim 2, further comprising the step of flowing a hydrocarbon through the flow line of said apparatus.

4. The method of claim 3, wherein the hydrocarbon is a natural gas or crude oil.

5. The method of claim 2, wherein the spacer of said apparatus includes an aerogel.

6. The method of claim 2, wherein the aerogel blanket of said apparatus comprises a material selected from the group consisting of silica aerogels, cellulose aerogels, precompressed aerogel and combination thereof.

7. The method of claim 2, wherein the pipe-in-pipe apparatus further comprises a thermal insulation strip positioned between the spacer and the flow line.

8. The method of claim 7, wherein the insulation strip includes an aerogel.

9. The method of claim 2, wherein the pipe-in-pipe apparatus further comprises a weld strip welded to the top of the spacer and to the inner side of the carrier pipe so as to increase the weld integrity and to spread the pressure load transmitted from the carrier pipe to the spacer.

10. The method of claim 2, further comprising monitoring the temperature of the apparatus at a plurality of locations.

11. The method of claim 2, wherein said spacer of said apparatus is ring-shaped.

12. The method of claim 2, wherein said aerogel blanket of said apparatus has a thermal conductivity less than or equal to 50 mW/m-K.

13. The method of claim 2, wherein said apparatus further comprises a phase change material that can respond to temperature changes in the flow line by changing phases, around the flow line.

14. The method of claim 2, wherein the spacer of said apparatus also comprises an aerogel material.

15. A method for thermally insulating a flow line comprising:
   providing a pipe-in-pipe apparatus according to claim 1; and
   flowing a fluid through the flow line.

16. The method of claim 2, wherein the aerogel blanket of said apparatus comprises aerogel particles.

17. The method of claim 15, wherein the fluid is liquefied natural gas.

18. The method of claim 15, wherein the spacer of said apparatus is made of an insulation material.

19. The method of claim 15, wherein the spacer of said apparatus is made of aerogel material.

20. The method of claim 15, further comprising monitoring the temperature of the apparatus at a plurality of locations.

21. The method of claim 15, further comprising providing a fiber-reinforcement within the annular space of said apparatus.

22. The method of claim 21, wherein the fiber reinforcement provided comprises microfibers, fibrous batting or lofty batting.

23. The method of claim 15, wherein the spacer of said apparatus is ring-shaped.

24. The method of claim 15, wherein said apparatus further comprises a phase change material that can respond to temperature changes in the flow line by changing phases within said annular space.

25. The method of claim 15, wherein the aerogel blanket of said apparatus comprises aerogel particles.

26. The pipe-in-pipe apparatus of claim 1, wherein said aerogel blanket is a fiber reinforced material.

27. The pipe-in-pipe apparatus of claim 26, wherein the fiber reinforced material comprises microfibers, fibrous batting or lofty batting.

28. The pipe-in-pipe apparatus of claim 1, wherein said aerogel blanket comprises a phase change material that can respond to temperature changes in the flow line by changing phases thereby reducing heat loss from said flow line.

29. The pipe-in pipe apparatus of claim 1, wherein said aerogel blanket comprises aerogel particles.

30. The pipe-in-pipe apparatus of claim 1, wherein said spacer is ring-shaped.

31. The pipe-in-pipe apparatus of claim 1, wherein the spacer includes an aerogel.

32. The pipe-in-pipe apparatus of claim 1, wherein the aerogel blanket comprises a material selected from the group consisting of silica aerogels, cellulose aerogels, precompressed aerogels and combinations thereof.

33. The pipe-in-pipe apparatus of claim 1, wherein the thermal conductivity of aerogel is less than or equal to 50 mW/mK.

34. The pipe-in-pipe apparatus of claim 1, further comprising a thermal insulation strip positioned between the spacer and the flow line.

35. The pipe-in-pipe apparatus of claim 34, wherein the insulation strip comprises an aerogel.

36. The pipe-in-pipe apparatus of claim 1, further comprising an aerogel strip mounted between the spacer and the flow line, between the spacer and the carrier pipe, or between the spacer and both the flow line and the carrier pipe.

37. The pipe-in-pipe apparatus of claim 1, wherein the spacer is in the form of a helical coil.

38. The pipe-in-pipe apparatus of claim 37, wherein the coil is in the form of a solid rod having a cross section in a shape selected from the group consisting of circular, elliptical, triangular, and trapezoidal.

39. The pipe-in-pipe apparatus of claim 37, wherein the coil is in the form of a tube having a cross section in a shape selected from the group consisting of circular, elliptical, triangular, and trapezoidal.

40. The pipe-in-pipe apparatus of claim 1, wherein the spacer is in the form of a tubular helical coil about the flow line, and the helical coil tube contains a heat-transfer medium or a vacuum for thermal management of the pipe in pipe.

41. The pipe-in-pipe apparatus of claim 40, wherein the helical coil tube contains a heat-transfer medium selected from the group consisting of water, alcohol, glycol, sodium and combinations thereof.

42. The pipe-in-pipe apparatus of claim 1, wherein the spacer is in the form of discrete rings spaced at substantially uniform intervals along the axial direction of the flow line.

43. The pipe-in-pipe apparatus of claim 42, wherein the rings are made of solid rod or tube having a cross section selected from the group consisting of circular, elliptical, triangular, and trapezoidal.

44. The pipe-in-pipe apparatus of claim 1, wherein said at least one spacer is made of solid rod or tube having a cross section selected from the group consisting of circular, elliptical, triangular, and trapezoidal.

45. The pipe-in-pipe apparatus of claim 1, wherein the overall heat transfer value from the carrier pipe to the flow line is at most 5 W/m$^2$-° C.

46. The pipe-in-pipe apparatus of claim 1, wherein the apparatus is an underwater subsea tree of pipelines filled with one or more hydrocarbons.

47. The pipe-in-pipe apparatus of claim 1, wherein the apparatus is an underwater riser.

48. The pipe-in-pipe apparatus of claim 1, wherein the apparatus is a liquefied natural gas tanker.

49. The pipe-in-pipe apparatus of claim 1, wherein the apparatus comprises more than one aerogel blanket.

50. The pipe-in-pipe apparatus of claim 1, wherein the spacer is made of an insulation material.

51. The pipe-in-pipe apparatus of claim 1, wherein the spacer is made of aerogel material.

52. The pipe-in-pipe apparatus of claim 1, further comprising temperature sensors positioned along said flowline or said carrier pipe to measure temperature at a plurality of locations in the apparatus.

53. The pipe-in-pipe apparatus of claim 1, wherein the thermal conductivity of the aerogel blanket is less than 20 mW/mK.

54. The pipe-in-pipe apparatus of claim 1, further comprising a phase change material.

* * * * *